US007185595B2

(12) United States Patent
D'Agostini et al.

(10) Patent No.: US 7,185,595 B2
(45) Date of Patent: Mar. 6, 2007

(54) METHOD FOR LARGELY UNSUPPORTED COMBUSTION OF PETROLEUM COKE

(75) Inventors: Mark D. D'Agostini, Hazelton, PA (US); William R. Welliver, Ship Bottom, NJ (US); Kevin B. Fogash, Wescosville, PA (US); Craig Cain-Borgman, Emmaus, PA (US); Alex Kravets, Bridgewater, NJ (US); Stefan Laux, Williamsville, NY (US)

(73) Assignees: Air Products & Chemicals, Inc., Allentown, PA (US); Foster Wheeler Energy Corp., Clinton, NJ (US)

( * ) Notice: Subject to any disclaimer, the term of this patent is extended or adjusted under 35 U.S.C. 154(b) by 0 days.

(21) Appl. No.: 10/488,583

(22) PCT Filed: Aug. 30, 2002

(86) PCT No.: PCT/US02/27770

§ 371 (c)(1),
(2), (4) Date: Sep. 15, 2004

(87) PCT Pub. No.: WO03/023280

PCT Pub. Date: Mar. 20, 2003

(65) Prior Publication Data

US 2005/0019715 A1     Jan. 27, 2005

(51) Int. Cl.
*F23D 1/00*     (2006.01)

(52) U.S. Cl. ...................................... 110/347

(58) Field of Classification Search ................ 110/210, 110/264, 347
See application file for complete search history.

(56) References Cited

U.S. PATENT DOCUMENTS

| 4,495,874 A | 1/1985 | Greskovich et al. |
| 4,515,095 A | 5/1985 | Greskovich |
| 4,602,575 A * | 7/1986 | Grethe ...................... 110/347 |
| 6,168,709 B1 | 1/2001 | Etter |
| 6,475,267 B1 * | 11/2002 | Lehn ........................... 95/271 |
| 2004/0074427 A1 * | 4/2004 | Kobayashi et al. ......... 110/347 |

FOREIGN PATENT DOCUMENTS

| DE | 3615759 A1 * | 11/1997 |
| EP | 0 731 327 A1 | 9/1996 |
| JP | 05271812 | 10/1993 |

OTHER PUBLICATIONS

International Search Report of Int'l Appln. No. PCT/US02/27770 dated Aug. 30, 2002.

* cited by examiner

*Primary Examiner*—Kenneth Rinehart
(74) *Attorney, Agent, or Firm*—RatnerPrestia

(57) ABSTRACT

Combustion of petroleum coke using air to carry the fuel into a combustion zone and to provide a source of oxidant. Enhanced combution utilizes oxygen introduced into or proximate primary, secondary, tertiary, quaternary, or overfire air to effect primary combustion of the fuel. Petroleum coke fuel in an oxygen supported air-petroleum coke combustion process can be used to re-power a utility boiler.

6 Claims, 11 Drawing Sheets

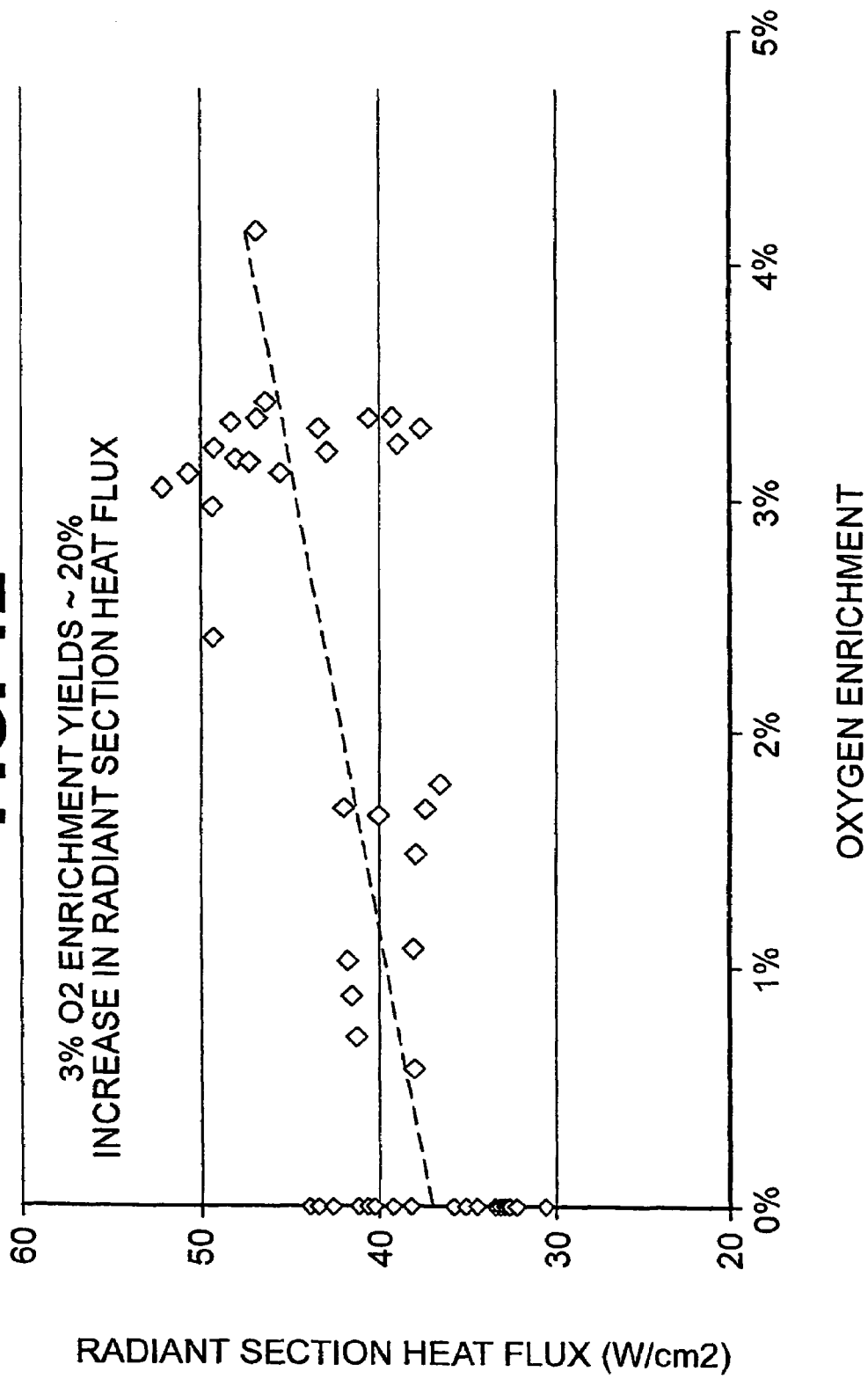

METHOD FOR LARGELY UNSUPPORTED COMBUSTION OF PETROLEUM COKE

BACKGROUND OF THE INVENTION

This Application is a U.S. National Phase Application of PCT International Application PCT/US502/27770.

BACKGROUND OF THE INVENTION

The present invention pertains to largely unsupported combustion of petroleum coke.

Prior attempts to facilitate the use of petroleum coke in combustion applications, summarized herein, have relied principally on furnace configuration, fuel blending and modification of the physical properties of petroleum coke.

Unsupported combustion of petroleum coke has been achieved in the past in down fired boilers (also known as down shot or arch fired) where solid fuel particles are exposed to relatively long residence times in the combustion zone. The combustion of 100% petroleum coke (often referred to as petroleum coke) has been demonstrated and commercially practiced in circulating fluidized bed combustors (CFBC's) at several locations. These were combustion systems that were specifically designed for the low volatile matter in the petroleum coke and result in long retention times supplemented by a recirculating load of bed material consisting of unburned fuel, ash and sorbent material (limestone).

However, since most existing fossil fuel utility boilers are wall-, corner- or turbo (i.e., generally horizontally) fired, the unsupported firing of petroleum coke in horizontal-fired boilers represents a case of greater practical interest. For the purpose of description of the prior art and the present invention the term horizontally refers to the position of the burner at an angle from coincident with a horizontal axis of the furnace up to an angle of 45° to that horizontal axis. In such units, solid fuel particles experience much shorter combustion zone residence times, rendering the stable and complete combustion of petroleum coke without a support fuel much more difficult to achieve. In fact, the unsupported firing of petroleum coke within a horizontally fired utility boiler has never been demonstrated. A common solution that facilitates the use of petroleum coke in horizontally fired pulverized coal boilers is to blend the petroleum coke with a support fuel; the petroleum coke typically comprising less than 50 wt % of the fuel (see references). Minimization of the petroleum coke within the fuel mixture allows for sufficient volatile matter to stabilize the combustion process.

Prior to the present invention the firing of 100% petroleum coke without any support fuel within a horizontally fired heating unit including, but not limited to, steam generators, industrial boilers and the like has never been demonstrated. For some horizontally fired utility boilers, a common solution is to blend the petroleum coke with a support fuel, with petroleum coke typically comprising less than 80% of the fuel. Minimization of the petroleum coke within the fuel allows for sufficient volatile matter to facilitate complete combustion of the fuel.

Another path is to actually alter the physical and/or chemical characteristics of the petroleum coke to facilitate conventional combustion as described by Patentees in U.S. Pat. No. 6,168,709B1. Patentees suggest alterations to the processes that produce petroleum coke in order to obtain a premium fuel grade petroleum coke that is more suitable for firing. However, even when utilizing a premium, fuel-grade petroleum coke, it has been suggested to use support fuel to improve low load flame stability.

None of the solutions mentioned above take full advantage of the current petroleum coke available on the market. The ability to reliably burn standard petroleum coke in existing horizontally-fired steam generator or utility boilers without alteration or addition of a support fuel would represent a much lower cost option with a greater potential for generating abundant and affordable electricity.

U.S. Pat. No. 4,515,095 teaches and claims methods for combustion of coal/water slurries using oxygen enrichment of the primary air used to burn the coal. However Patentees could not combust coal/water slurries where the volatile content of the coal was below 20%.

SUMMARY OF THE INVENTION

The present invention pertains to the firing of petroleum coke, especially in a wall-, corner- or turbo-fired steam generator (boiler). In particular, the present invention pertains to the re-powering, with petroleum coke, of such boilers originally designed for burning an alternate fuel such as coal, oil or natural gas. More specifically, the present invention pertains to the unsupported (100% of fuel is petroleum coke) or nearly unsupported (80+% petroleum coke, balance alternate support fuel) firing in such boilers, especially where the steam generated from those boilers is used to generate electric power. Re-powering of an existing utility boiler with petroleum coke, which is an inexpensive fuel, has the potential to reduce electricity generation costs. A primary goal of this invention is the combustion of petroleum coke within a wall-, corner- or turbo-fired steam generator without other support fuel, except during the boiler start-up period and other periods of intermittent and/or low load operation, where a support fuel may be required. Another objective is the combustion of petroleum coke with minimal support fuel in a wall-, corner- or turbo-fired steam generator. Thus the petroleum coke would be used in place of other fossil fuels. The elimination of support fuels would reduce the operating costs and operating problems associated with storing, blending and co-currently firing dissimilar fuels. Complete elimination of support fuels (i.e. fuel is 100% petroleum coke) would reduce operating and equipment costs and, therefore, significantly lower power and steam production costs relative to the case where minimal support fuel (<20%) is used. In a preferred embodiment, the invention features low-level (less than 10 vol. %) oxygen enrichment, to provide many performance benefits relative to air-fuel operation, including a) greater turndown via increased flame stability b) lower emissions than possible with air firing c) increased radiant transfer within the combustion zone c) increase in boiler thermal efficiency and d) increase in boiler fuel-throughput. Enrichment with oxygen (or substantially pure oxygen), as designated herein, refers to the use of an oxidizer with oxygen concentration (prior to mixing with other fuel or combustion air streams) equal to or greater than 60 vol. %. The enrichment level, as designated herein, is equal to the increase in volumetric oxygen concentration of the oxidizer above the baseline level. Hence, where the baseline oxidizer is air, an oxygen enrichment level of 10% corresponds to an overall oxidizer oxygen concentration (i.e. when all oxidizer streams are considered) of approximately 31%.

Therefore in one aspect, the present invention is; a method for combusting petroleum coke, comprising the steps of: introducing a stream of primary air and petroleum coke into a combustion zone in a manner that promotes stable and sustained combustion; simultaneously introducing one or more of, secondary, tertiary or quaternary air proximate the stream of primary air and petroleum coke as it enters the combustion zone; optionally introducing over-fire air at a location above the combustion zone; and introducing oxygen into or proximate one or more of; the primary air/petroleum coke stream as it enters the combustion zone, the secondary air, the tertiary air, the quaternary air or the over-fire air, the oxygen introduced in an amount to raise the overall oxygen concentration to a maximum of 10% by volume greater than when combusting the petroleum coke using only air as a source of oxidant.

In another aspect, the present invention is; a method of combusting petroleum coke in a furnace having a primary combustion zone and an over-fire air zone comprising the steps of: introducing a stream of primary air and petroleum coke into the primary combustion zone; simultaneously introducing one or more of, secondary, tertiary or quaternary air proximate the stream of primary air and petroleum coke as it enters the combustion zone; introducing over-fire air into the over-fire air zone; and introducing substantially pure oxygen into or proximate one or more of, the primary air and petroleum coke stream as it enters the combustion zone, the secondary air, the tertiary air, the quaternary air or the over-fire air, the substantially pure oxygen introduced in an amount to raise the overall oxygen concentration to a maximum of 10% by volume greater than when combusting the petroleum coke using only air as a source of oxidant.

Yet another aspect of the present invention is a method of combusting petroleum coke comprising the steps of: taking a primary air-petroleum coke stream and increasing the solids concentration in the feed stream by removing a portion of the primary air to create a feed stream enriched in petroleum coke; introducing the feed stream enriched in petroleum coke into a combustion zone in a swirling motion; and simultaneously introducing one or more of, secondary, tertiary or quaternary air proximate the feed stream; whereby a region of gas re-circulation is created downstream of where the feed stream is introduced into the combustion zone with a reduction of any dilution effect from primary air carrying the petroleum coke into the combustion zone.

In still another aspect, the present invention is; a method for eliminating support fuel requirements when combusting petroleum coke using air-fuel combustion in a combustion zone comprising the steps of: discontinuing introduction of support fuel into said combustion zone; introducing a stream of primary air and petroleum coke into the combustion zone; simultaneously introducing one or more of, secondary, tertiary or quaternary air proximate the stream of primary air and petroleum coke as it enters the combustion zone; optionally introducing over-fire air at a location above the combustion zone; and introducing substantially pure oxygen into or proximate one or more of; the primary air/petroleum coke stream as it enters the combustion zone, the secondary air, the tertiary air, the quaternary air or the over-fire air, the substantially pure oxygen introduced in an amount to raise the overall oxygen concentration to a maximum of 10% by volume greater than when combusting the petroleum coke using only air as a source of oxidant.

A further aspect of the present invention is a method for reducing NOx emissions during combustion of petroleum coke, comprising the steps of: introducing a stream of primary air and petroleum coke into a combustion zone; simultaneously introducing one or more of, secondary, tertiary or quaternary air proximate the stream of primary air and petroleum coke as it enters the combustion zone; introducing over-fire air at a location above the combustion zone, introducing substantially pure oxygen into or proximate one or more of, the primary air/petroleum coke stream, secondary air, or tertiary air as it enters the combustion zone, the substantially pure oxygen introduced in an amount to raise the overall oxygen concentration to a maximum of 10% by volume greater than when combusting the petroleum coke using only air as a source of oxidant; and maximizing the volume of the over-fire air introduced into the combustion zone.

Still a further aspect of the present invention is a method of combusting petroleum coke with reduced NOx emissions in a furnace having a primary combustion zone and an over-fire air zone comprising the steps of: introducing a stream of primary air and petroleum coke into the primary combustion zone; simultaneously introducing one or more of, secondary, tertiary or quaternary air proximate the stream of primary air and petroleum coke as it enters the combustion zone; introducing a maximum quantity of over-fire air into the over-fire air zone; and introducing substantially pure oxygen into or proximate, the primary air and petroleum coke stream as it enters the combustion zone and the over-fire air, the substantially pure oxygen introduced in an amount to raise the overall oxygen concentration to a maximum of 10% by volume greater than when combusting the petroleum coke using only air as a source of oxidant, with all of the oxygen introduced into the over-fire air, unless a portion of the oxygen is introduced into the primary air/petroleum coke stream, secondary air or tertiary air as necessary to stabilize the burner flame.

In yet a further aspect the present invention is a method for combustion petroleum coke, comprising the steps of; introducing a stream of primary air and petroleum coke into a combustion zone in a manner that promotes stable and sustained combustion, simultaneously introducing one or more of, secondary, tertiary or quaternary air proximate the stream of primary air and petroleum coke as it enters the combustion zone, optionally introducing over-fire air at a location above the combustion zone; and introducing oxygen into or proximate one or more of; the primary air/petroleum coke stream as it enters the combustion zone, the secondary air, the tertiary air, or the quaternary air, the oxygen introduced in an amount to raise overall oxygen concentration in the combustion zone to a maximum of 10% by volume greater than when combusting the petroleum coke using only air as a source of oxidant.

BRIEF DESCRIPTION OF THE DRAWINGS

FIG. 4b is a front view of the air-fuel assembly of FIG. 4a.

FIG. 5b is a fragmentary section taken along line 5b—5b of FIG. 5a.

FIG. 12 is a plot of radiant section heat flux against percent oxygen enrichment for a petroleum coke demonstration trial under full load conditions.

DETAILED DESCRIPTION OF THE INVENTION

Figure 1:
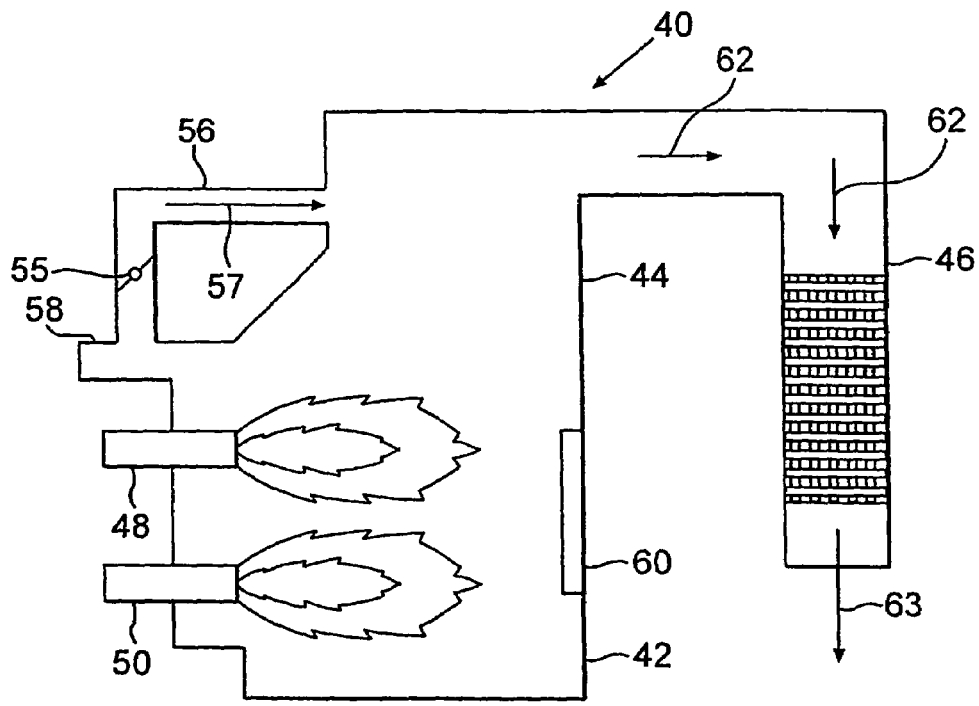
FIG. 1 is a schematic representation of a test furnace used to demonstrate the present invention.

This invention pertains to processes for combusting petroleum coke that, aside from grinding, pulverizing and/or micronizing required for pneumatic transport, has been unaltered either physically or chemically from the original refinery process and contains less than 20% volatile content (as determined by ASTM D3175); in particular combustion of petroleum coke within a horizontally fired utility boiler with little (<20%) or no support fuel. The processes of the invention can be applied to wall fired, corner fired and turbo furnace arrangements for suspension burning. Furthermore, a preferred embodiment of the invention uses selective O2 enrichment to enhance the combustion process. Selective O2 enrichment, as proven through pilot scale tests described herein, allows for a) greater turndown via increased flame stability b) lower emissions than possible with air firing c) increased radiant heat transfer within the combustion zone d) increase in boiler thermal efficiency and e) increase in boiler fuel-throughput.

Stable combustion of pulverized fuel is dependent on factors such as the pulverized fuel grind size, porosity, volatile content, burner aerodynamics, combustion chamber temperature and overall stoichiometry. Assuming equality of all other factors, increasing the fuel volatile content improves flame stability since volatile combustion is a principal source of particle heat up during the initial stages of char (i.e. solid particle) burning. Hence, flames generated from low volatile fuels such as petroleum coke are relatively difficult to stabilize in continuous, suspension-fired combustion systems. The methods disclosed herein for stabilizing the combustion of unsupported petroleum coke in wall-fired boilers fall into two categories; increase of solid particle heat up via controlled particle-gas mixing during air-fuel operation, and strategic injection of high purity oxygen.

Increasing the solid particle heat up rate is accomplished by a combination of two means; increasing particle residence time prior to completion of air-fuel mixing, and increasing the solid particle concentration in the primary (conveying) air-fuel stream discharging from the burner. The first of these means is achieved by creating a region of gas re-circulation immediately downstream of the burner exit. Finer particles are drawn into this re-circulation zone and are thereby afforded longer residence time, leading to higher rates of heat release near the base of the flame. A common method of generating the re-circulation zone is through establishing a swirling (i.e. tangential) component to one or more of the reactant streams exiting the burner. Increasing the solid concentration within the primary air-fuel stream reduces the total mass of the conveying medium, facilitating a more rapid increase in particle temperature, thereby adding stability to the combustion process. Particle concentrations upstream of the burner are typically constrained by requirements inherent to the grinding, drying and conveying processes. Hence, for conventional systems, it is most convenient to alter the concentration close to the point of discharge into the combustion space. One method of achieving this is to effect a partial separation of solid fuel and conveying air through application of centrifugal force at the burner inlet. Results of pilot scale tests show that the combination of these two means, swirl-induced re-circulation and partial separation of petroleum coke/conveying air generates a much more stable flame than the use of re-circulation alone.

Enrichment of combustion air with a stream or streams of relatively high purity oxygen (e.g. greater than 60 vol. % O2) enhances the combustion process by increasing the rate of diffusion between fuel and oxidizer (via higher O2 concentration) and increasing combustion temperatures (via reduced nitrogen dilution). Therefore, particle heat up is much more rapid and combustion is inherently more stable. Moreover, the higher flame temperatures provide higher rates of radiant heat transfer and more complete carbon burnout, while the lower nitrogen concentration in the product gas leads to higher energy efficiency and lower exhaust gas flow rates. This aspect of the present invention calls for the strategic injection of low levels of oxygen enrichment, i.e. up to 10 vol. % increase in the O2 concentration of combustion air at the boiler's rated (full) load, into the combustion of suspension-fired petroleum coke in a wall, corner, or turbo fired utility boiler. Depending on the objective, the oxygen can be mixed with the combustion air stream(s) outside of the boiler or separately injected into the boiler in stream(s) of relatively high O2 concentration. Further, the enriching oxygen can be introduced within the burner passages, near the burner outlet or relatively far away from the burner flame. Pilot scale test results illustrate potential benefits associated with each of the various modes of oxygen injection.

In a demonstration of this invention, additional O2 was selectively added to the wind-box, tertiary air and over-fire air (OFA) streams. It was found that O2 addition in the wind-box and tertiary air results in an increased range of burner operation, higher thermal efficiency and enhanced radiant section heat transfer. It was found, moreover, that strategic injection of O2 into all aforementioned combustion air streams, when coupled with optimized operation of over-fire air dampers, can significantly reduce NOx emissions without degrading combustion efficiency.

The technical feasibility of combustion of petroleum coke without any support fuel, with and without oxygen enrichment, was demonstrated at the Combustion and Environmental Test Facility (CETF) of Foster Wheeler Energy Corporation located in Dansville, N.Y. The combustion system 40 shown schematically in FIG. 1 is a 70 MMBtu/hr pilot scale facility used for development and testing of solid fuel combustion technologies. Referring to FIG. 1 the test furnace system 40 includes a main combustion zone 42, over-fire air zone 44 and a gas cooling section 46. Horizontally-fired burners 48, 50 receive air through a wind-box 58, which also introduces over-fire air into the furnace 40 via a conduit system 56. Combustion air (with the exception of that used for fuel transport) is introduced into the furnace through two plenums; a wind-box that discharges through the burner air passages and an over-fire air (OFA) duct delivering the air above the burner level near the top of the radiant section. The high temperature section of the furnace is predominantly refractory-lined, except for a water-cooled "slag panel" 60 used to measure radiant heat absorption from the flames. After exiting the radiant section, products of combustion shown by arrow 62, flow through a water-cooled "gas cooler" 46 and finally represented by arrow 63 to the air pre-heater and remainder of the unit's cold end (not shown).

Figure 2:
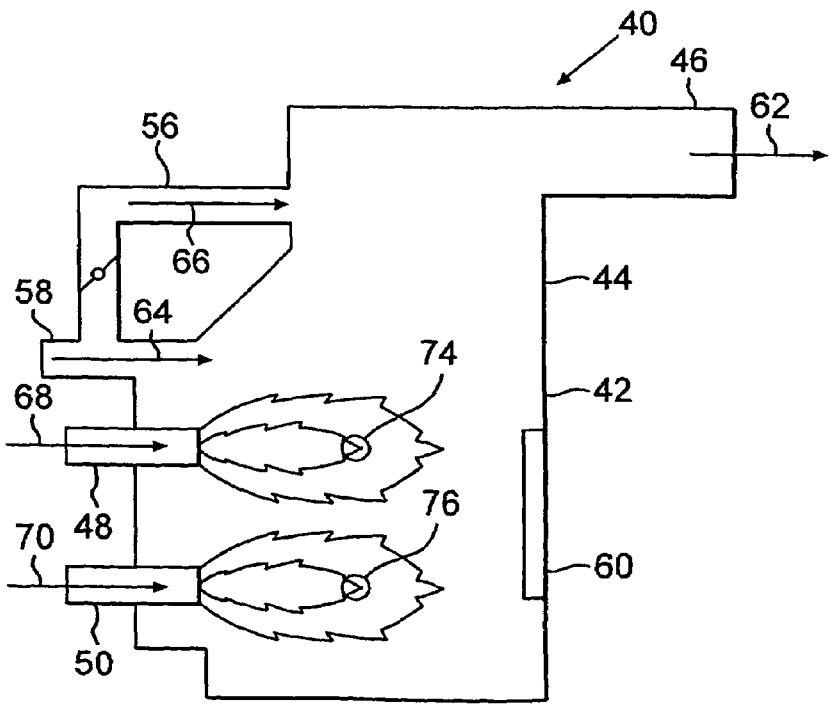
FIG. 2 is a schematic representation of the furnace of FIG. 1 showing modifications used to demonstrate the present invention.

Referring to FIG. 2 the test furnace system 40 was fitted with means to introduce oxygen into the wind-box as shown by arrow 64, into the over-fire air as shown by arrow 66, and into the burners as shown by arrows 68, 70. Oxygen introduction into the burners, 48, 50 can be through the central conduit which can also be used to introduce tertiary air into the burners 48, 50. One such burner will be described in relation to FIG. 3. FIG. 2 also shows the location of water-cooled heat flux probes 74, 76 used to measure total heat flux in the radiant section of the furnace. The cooling section of the combustion system 40 is not shown in FIG. 2. However, the products of combustion as represented by arrow 62 are treated in a like manner.

As shown in FIG. 2, oxygen was delivered to the furnace via injection nozzles in the wind-box, OFA registers and along the axis of each burner through the so-called tertiary air pipe. The flow rate of tertiary air, which is bled off the wind box, although not measured during these tests, is known to be a small fraction of the total combustion air flow. Thus, the maximum oxygen enrichment (percent increase in local oxygen concentration) at this location was substantially higher than in either the wind-box or OFA register.

Figure 3:
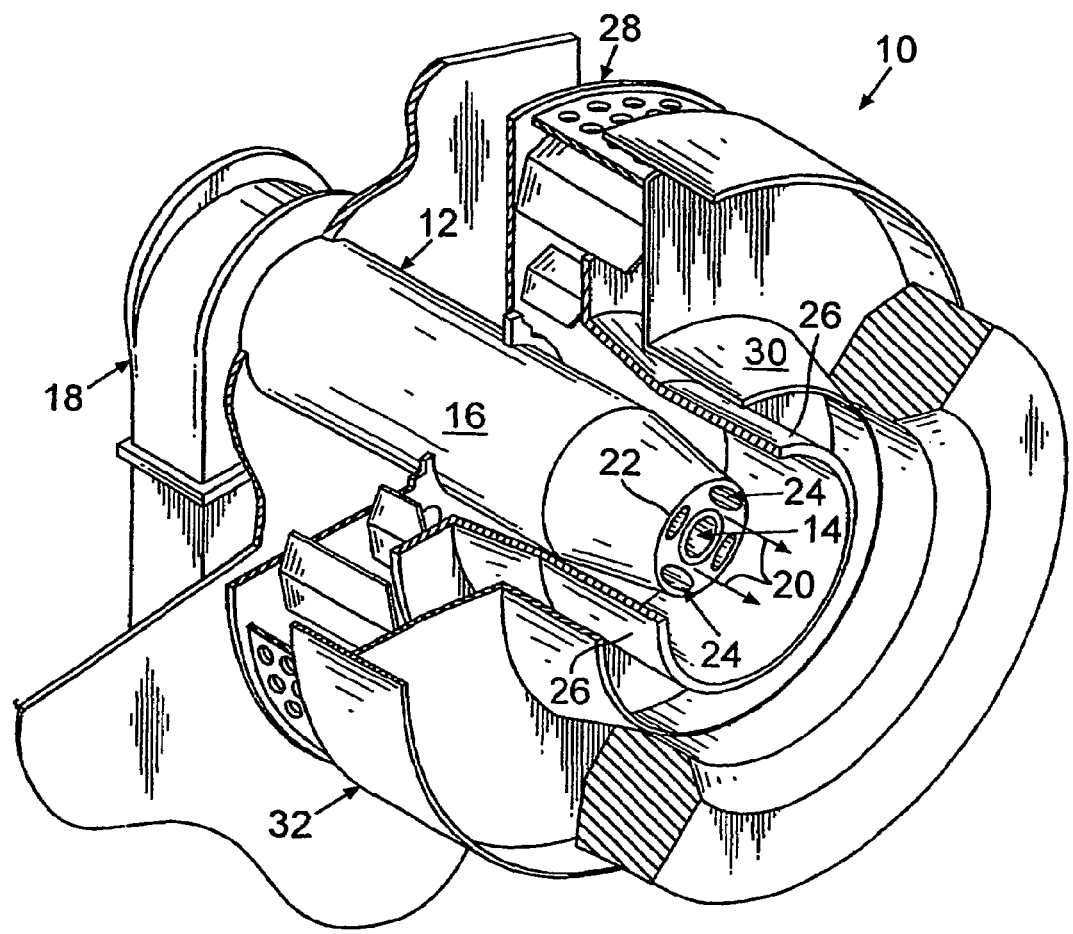
FIG. 3 is an isometric schematic drawing partially in section of burner suited to practice the present invention.

Four burner designs and three petroleum coke supplies were used to demonstrate various aspects of the present invention. Referring to FIG. 3, a burner 10 adapted to burn a solid carbonaceous fuel and air was used in testing the methods of the present invention. Burner 10 includes a central air-fuel assembly 12. Air-fuel assembly 12 includes an inner tube or conduit 14 surrounded by a nozzle conduit 16 held in spaced relationship to conduit 14. Air and fuel are introduced into the annulus between conduits 14, 16 by means of a tangential fuel injection system 18. Air and fuel exit the assembly 12 in the direction shown by arrows 20. The forward or nozzle end 22 of assembly 12 can contain vanes or curtains 24 to produce a split flow of air and fuel as it exits assembly 12. Surrounding assembly 12 is a generally concentric air conduit 26 so that secondary air via air hood 28 can be introduced into the burner 10 and directed around the air-fuel mixture entry assembly 12. A second generally concentric air conduit 30 surrounds and is spaced apart from air conduit 26 so that additional secondary air can be introduced into the combustion zone of a furnace via air hood 28. Conduit 30 can be part of a moveable air hood used to adjust burner firing. Inner conduit 14 can be moved longitudinally relative to conduit 16 to also change the firing characteristics of burner 10.

Air fuel delivery system 18 is adapted to introduce the air fuel mixture tangentially into the burner 10.

Burner 10 can also include a system that increases the solids content of the air fuel mixture prior to entering the burner 12 by separating a portion of the air for injection as secondary air into burner 10. Such a system is shown and described in pending U.S. patent application Ser. No. 09/734,708 filed Dec. 13, 2000, the specification of which is incorporated herein by reference.

FIGS. 4a and 4b and 5a and 5b show additional burners used during the demonstration program. These differ from the burner described in FIG. 3 essentially by the aerodynamic characteristics imparted to the petroleum coke/primary air stream as it exits the burner nozzle. In particular, only the outermost of the two air conduits surrounding the primary air/fuel conduit imparts a tangential, or swirling, component to the secondary air.

The recirculation of pulverized fuel downstream of the nozzle exit is therefore not as strong as that created by the burner described in FIG. 3. Hence, the burners illustrated in FIGS. 4a and 4b and 5a and 5b will produce flames that are inherently less stable on low volatile fuel than a flame produced by the burner illustrated in FIG. 3. There are also differences in the pulverized fuel/primary air nozzle design between the burners that may also impact stability and affect performance.

Figure 4A:
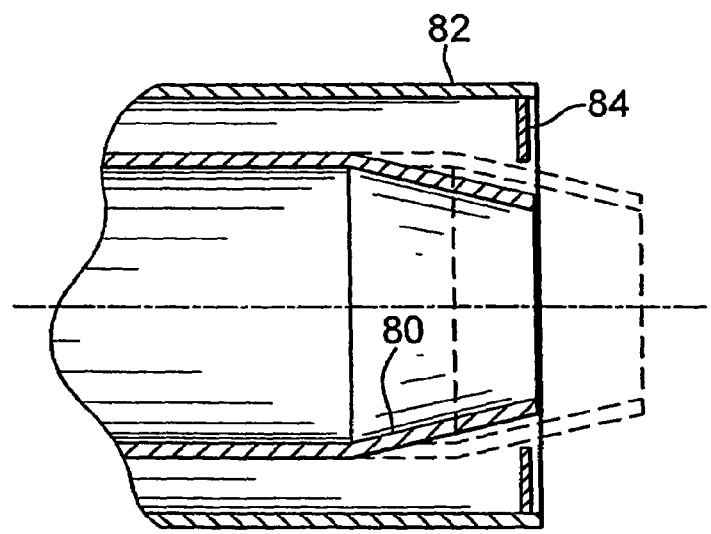
FIG. 4a is a partial elevational cross-sectional view of an alternate air fuel assembly for the burner of FIG. 3.
Figure 4B:
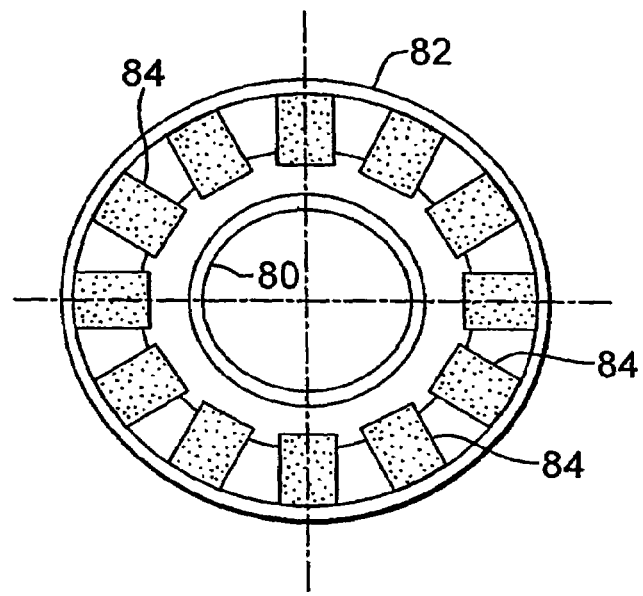

FIGS. 4a and 4b show the fuel tip 80 used in certain tests of the present invention. Fuel tip 80 can be positioned at different longitudinal projections relative to the air-fuel conduit 82, which is similar to conduit 16 of FIG. 3, as shown by the dotted line representation of nozzle or fuel tip 80 in a forward position. Disposed around the inner surface of air-fuel conduit 80 are a series of equally spaced deflectors or teeth 84. For example, the type of split in the fuel/primary air stream created by the burner described in relation to FIGS. 4a and 4b using 12 equally spaced teeth 84 is different than the split occurring in the nozzle of the burner described in FIG. 3.

Figure 5A:
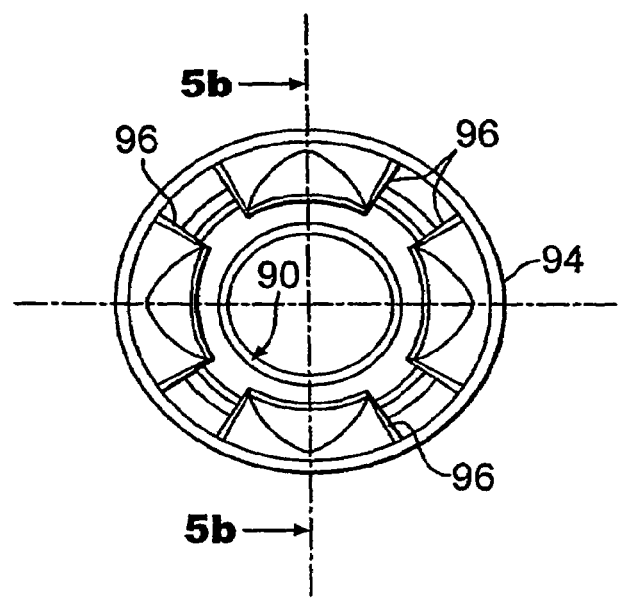
FIG. 5a is a front elevational view of an alternate air-fuel assembly used in the present invention.
Figure 5B:
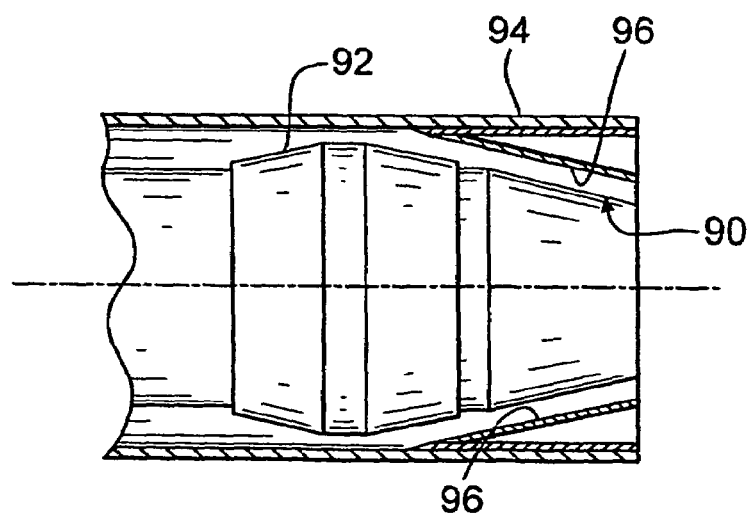

Referring to FIGS. 5a and 5b the adjustable tip 90 is provided with a flow direction section 92 which is also referred to as a kicker. Adjustable tip 90 is moveably positioned within the air-fuel conduit 94 which contains equally spaced deflector plates 96 on the inner surface of the conduit 94. The "kicker" 92, inserted into the pulverized fuel/primary air nozzle of the burner illustrated in FIG. 5, is absent in the burner described in FIG. 3.

For the purpose of discussion and presentation of the demonstration results, the burner described by FIG. 3 is referred to as Burner A. When this burner was used with the system that increases the solids content of the air fuel mixture, as shown and described in pending U.S. patent application Ser. No. 09/734,708, the composite burner system is referred to as Burner B. The burner nozzle assemblies illustrated in FIGS. 4a and 4b is referred to as Burner C, while the burner nozzle assembly illustrated in FIGS. 5a and 5b is referred to as Burner D.

Table 1 contains typical analyses of the three petroleum cokes used during the enrichment trials. Note, in particular, that the ash content of the petroleum cokes is of the order of 1%. This is in contrast to typical pulverized coals of similar volatile content that frequently contain 8–10% ash.

TABLE 1

Typical Analyses of Petroleum Coke Used in Oxygen Enrichment Trials

| Parameter | ASTM Method | Petroleum coke #1 | Petroleum coke #2 | Petroleum coke #3 |
|---|---|---|---|---|
| Carbon (wt. %) | D3178 | 82.6 | 77.0 | 78.0 |
| Hydrogen (wt. %) | D3178 | 3.49 | 3.55 | 3.44 |
| Oxygen (wt. %) | D3176 | 0.64 | 1.43 | 2.90 |
| Nitrogen (wt. %) | D3179 | 0.89 | 1.03 | 1.14 |
| Sulfur (wt. %) | D4239, method 3.3 | 5.79 | 2.49 | 4.91 |
| Ash (wt. %) | D3174 | 0.74 | 1.13 | 1.15 |
| Moisture (wt. %) | D2961, D3302, D3173 | 5.85 | 13.41 | 8.46 |
| Volatile Matter | D3175 | 10.59 | 11.38 | 10.76 |

TABLE 1-continued

Typical Analyses of Petroleum Coke Used in Oxygen Enrichment Trials

| Parameter | ASTM Method | Petroleum coke #1 | Petroleum coke #2 | Petroleum coke #3 |
|---|---|---|---|---|
| (wt. %) | | | | |
| Higher Heating Value (Btu/lb) | D2015, D1989 | 14,236 | 13,373 | 13,708 |

A typical size distribution for all as-received petroleum cokes is shown in Table 2.

TABLE 2

Typical As-Received Petroleum Coke Size Distribution

| Dimension | % Present |
|---|---|
| ¼" × 0 | 45% |
| 1" × ¼" | 36% |
| 2" × 1" | 9% |
| 3" × 2" | 8% |
| Greater than 3" | 2% |

Tests were conducted with both "pulverized" and "micronized" petroleum cokes. Typical size analysis of the as-fired, pulverized petroleum cokes was 95% passing a 200-mesh (75 micron aperture) screen and 84% passing a 325-mesh (44 micron aperture) screen. Typical size analysis of the as-fired micronized petroleum cokes was 100% passing a 200-mesh screen and 95% passing a 325-mesh screen. Combustion performance was substantially the same for both petroleum coke size distributions. Only the quantitative results of the pulverized petroleum cokes are presented herein. It is to be noted that the size distributions of both the pulverized and micronized petroleum cokes is substantially finer than achieved with typical pulverized coal, where typically 70–80% of the pulverized fuel passes through a 200-mesh screen.

There were no other physical alterations and no chemical alterations or treatments applied to the petroleum cokes used for test purposes.

Petroleum coke firing rates during the trials were varied from 1800 to 6000 lb/hr, while the flow rate of high purity oxygen was varied from 0 to 2200 lb/hr and divided among the three injection locations on a test-by-test basis. The maximum oxygen flow rate corresponded to an overall volumetric enrichment (i.e. Total Oxygen Enrichment) of roughly 4% O2 in the combustion air at full load conditions. Individual enrichment of the wind-box, OFA and tertiary air streams were higher in inverse proportion to the amount of combustion air flowing through the respective passages. A summary of test conditions is presented in Table 3.

TABLE 3

Demonstration Test Conditions

| Parameter | Minimum Value | Maximum Value |
|---|---|---|
| Petroleum Coke Flow Rate | 1800 lb/hr | 6000 lb/hr |
| Oxygen Flow Rate | 0 lb/hr | 2200 lb/hr |
| Total Full Load* Oxygen Enrichment | 0 vol. % | 4 vol. % |
| Full Load* Wind-box Oxygen Enrichment | 0 vol. % | 5 vol. % |
| Full Load* Over-fire Air- | 0 vol. % | 16 vol. % |

TABLE 3-continued

Demonstration Test Conditions

| Parameter | Minimum Value | Maximum Value |
|---|---|---|
| Oxygen Enrichment Full Load* Tertiary Air-Oxygen Enrichment | 0 vol. % | Substantially higher than OFA enrichment |

*Note:
Full-load refers to petroleum coke flow rates greater than or equal to approximately 4500 lb/hr. Oxygen enrichment levels were substantially higher at reduced load conditions.

Results of Petroleum Coke Combustion Trial

Results of the demonstration trial in which unsupported petroleum coke combustion was tested with and without oxygen enrichment are presented herein with respect to flame temperature, flame stability/boiler turndown, energy efficiency, carbon-in-ash, radiant section heat transfer, NOx emissions and boiler fuel-throughput. Particular emphasis is placed on the benefits afforded by low-level oxygen enrichment. When it is necessary to distinguish between results achieved with the different petroleum cokes and/or burners employed during the trial, the following nomenclature is adapted:

Test runs are designated by a number letter combination, e.g. 2C, where the number designates the particular petroleum coke used (Table 1 Petroleum Coke sample 1, 2 or 3) and the letter designates the burner used (A, B, C or D). Thus, for example, test run 2C indicates the combination of petroleum coke #2 and burner C.

Flame Temperature

Figure 6:
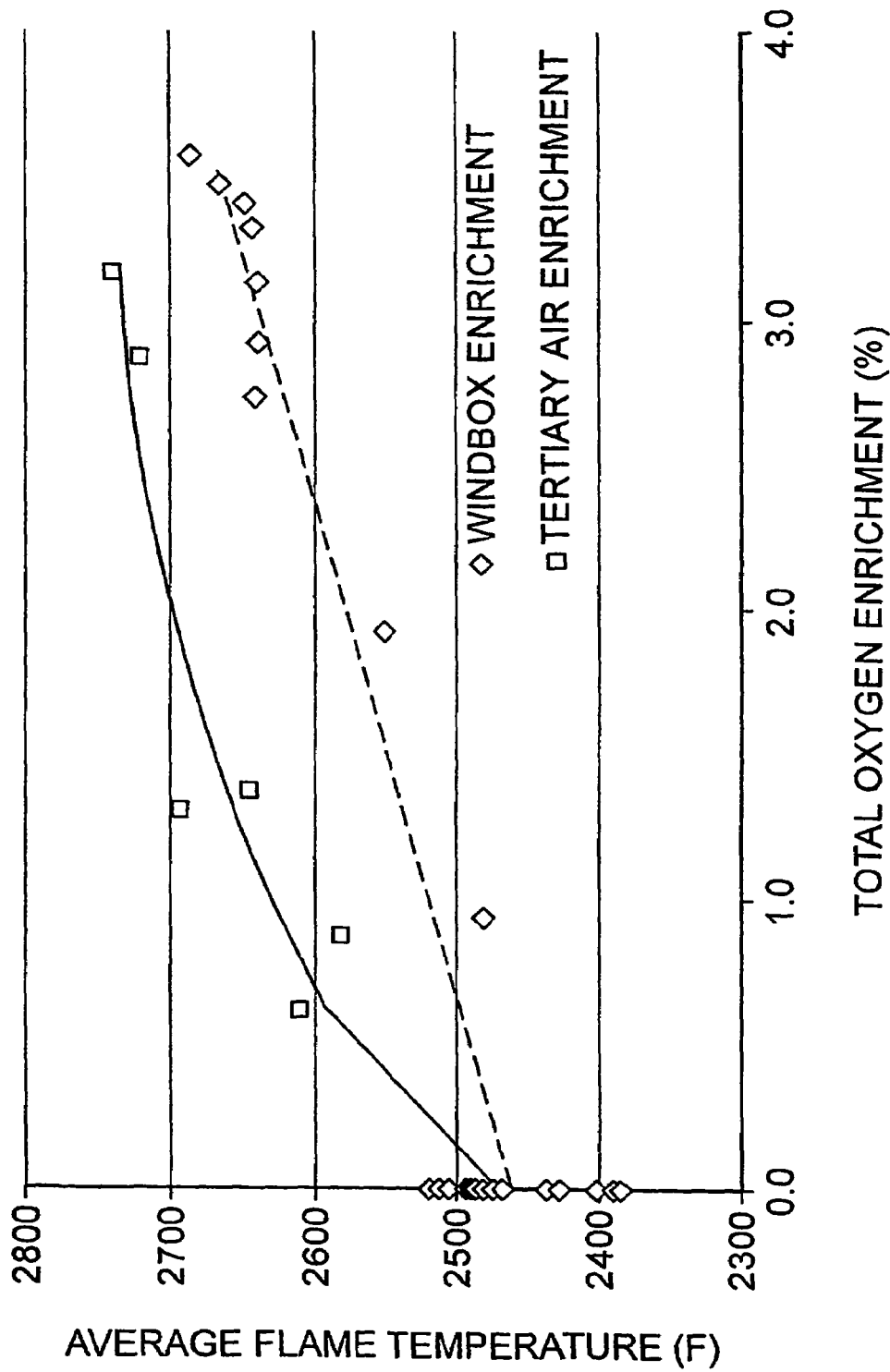
FIG. 6 is a plot of average flame temperature against percent oxygen enrichment for a petroleum coke demonstration trial test run under full load operation.
Figure 7:
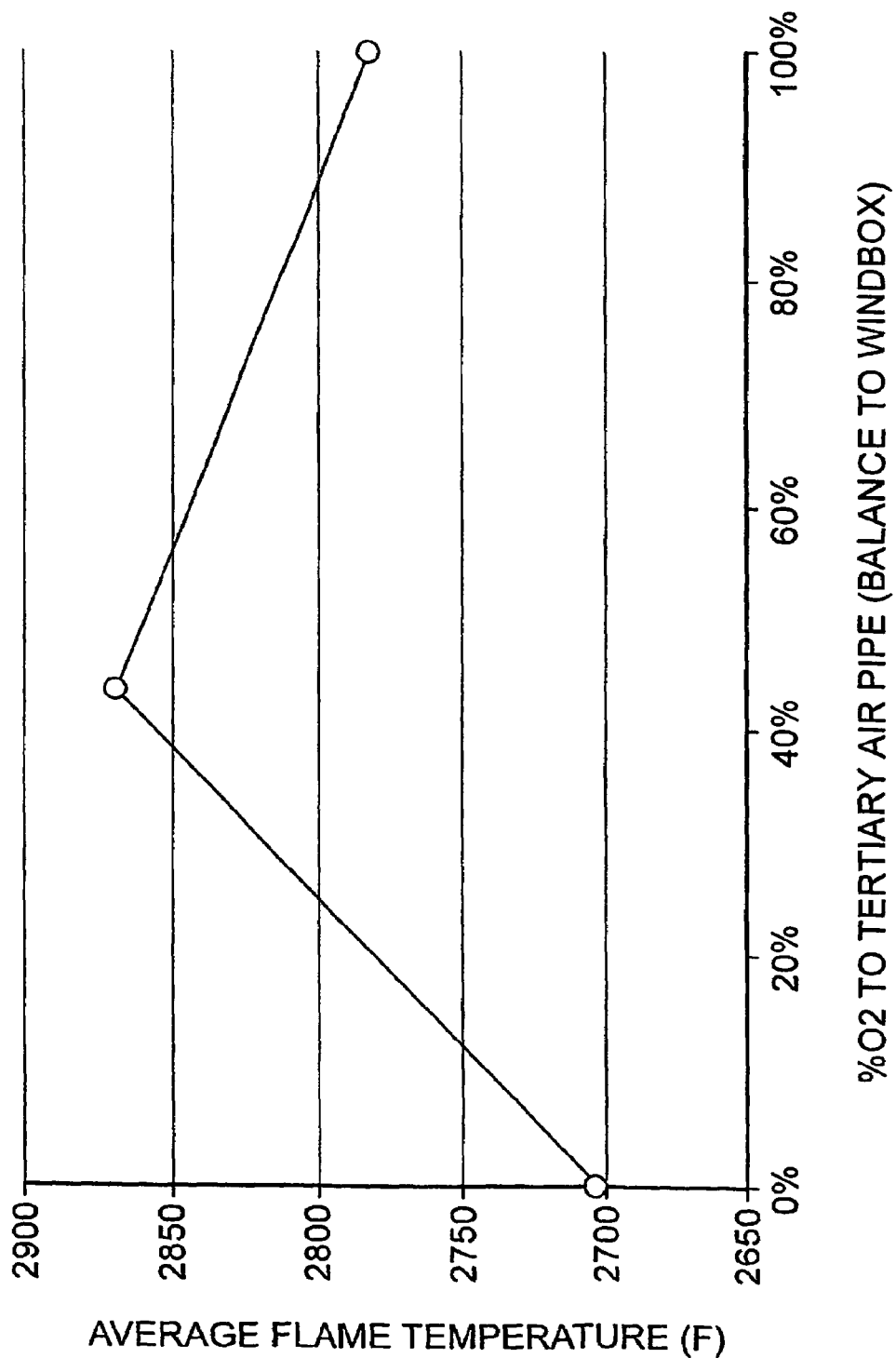
FIG. 7 is a plot of average flame temperature against the percentage split of enriched oxygen between the wind box and tertiary air pipe for a petroleum coke demonstration trial under full load conditions.

Temperatures were measured at six fixed positions in the flame using an infrared pyrometer. Average (of all 6 readings) flame temperature data from test run 1B is summarized in the plot of FIG. 6, which illustrates a sharp increase in flame temperature with oxygen enrichment, as well as a strong influence of injection location. Specifically, a 200° F. increase in flame temperature was generated by approximately 3.5% total oxygen enrichment into the wind-box, while essentially the same increase in flame temperature was achieved with roughly ⅓ the oxygen flow rate through the tertiary air pipe of each burner. This illustrates the magnified influence of the higher oxygen concentrations through the tertiary air pipe and strongly suggests this location will result in more efficient utilization of oxygen for this burner design. It is to be expected, however, that different burner designs will yield different optima with respect to oxygen utilization. For example, in FIG. 7, flame temperature data from test run 3D are plotted versus % oxygen enrichment to the tertiary air pipe (balance delivered to wind box). Results here indicate a peak in flame temperature with roughly a 40/60 split between tertiary air and wind box O2 enrichment.

The increase of local combustion temperatures by oxygen injection close to the burner tip benefits the petroleum coke combustion in all horizontally fired boilers, regardless of the configuration and location of the burner nozzles. This invention applies to wall fired boilers with swirl stabilized burners, to wall fired boilers with jet burners (so called "turbo-furnaces") and to tangentially fired boilers, where the burners are either mounted in the furnace corners or in the walls and are directed on to a common firing circle in the furnace center.

Flame Stability, Boiler Turndown

Flame stability, as defined herein, refers to the ability to establish a flame front (location of first visible indication of the flame downstream of the nozzle exit) that is essentially attached to the burner nozzle. Attached flame fronts are inherently stable. That is, attached flame fronts give rise to stable combustion performance and the ability to turn down the burner and boiler below design operating conditions. By contrast, detached, or lifted, flame fronts denote those conditions where the first visible indication of the flame is located appreciably far away from the burner nozzle (sometimes by several feet in large industrial or utility burners). Detached flames are inherently unstable and oscillatory, leading to unsteady combustion performance and often to "blow off", in which there is complete extinction of the flame. In large industrial and utility boilers that use continuous flame monitoring, the latter consequence typically results in an immediate shutdown (trip) of the unit. Detached or lifted flames are thus clearly an unsafe and undesirable condition.

Flame stability results were characterized in the demonstration tests by the ability to maintain an attached burner flame as the petroleum coke firing rate was gradually reduced. A summary is presented in Table 4, showing the maximum "turndown" achieved with and without oxygen enrichment during various phases of the demonstration. Results indicate a wide variety of air-fuel stability. Since burner stability is strongly influenced by petroleum coke volatility and particle fineness (grind size), both of which stayed essentially constant among the data reported, the observed differences in stability are primarily due to the different designs. However, regardless of the air-fuel stability, a substantial improvement was always attained with oxygen enrichment. This enhancement in flame stability is due to the higher flame temperatures achieved with oxygen enrichment leading to higher rates of chemical reaction that, in turn, lead to higher flame propagation speeds. Oxygen enrichment locations for the flame stability/boiler turndown tests were in the windbox and tertiary air pipes.

TABLE 4

Petroleum Coke Flame Stability/Boiler Turndown Results

| Test Run | Minimum Stable Load with Air-Fuel Combustion | Minimum Stable Load with O2 Enriched Combustion |
|---|---|---|
| 1A | 96% of Full Load[1] | 52% of Full Load |
| 1B | 58% of Full Load | 40% of Full Load[2] |
| 3C | Unstable at 100% Load | 50% of Full Load |
| 3D | Unstable at 100% Load | 70% of Full Load |

Notes:
[1]Full load assumed to be 4500 lb/hr of petroleum coke.
[2]Represents the minimum load of the boiler.

Energy Efficiency/Carbon-in-Ash

Oxygen enriched combustion yields improved energy efficiency due to higher flame temperatures, lower parasitic energy loss to nitrogen in the combustion air and more complete char burnout. Heat balance calculations were made based on data collected during test run 1B of the demonstration program. Results, summarized in Table 5, indicate an 11% increase in the full load energy utilization in the furnace and convective pass sections of the furnace corresponding to 3.2% oxygen enrichment.

TABLE 5

Full Load Heat Absorption Results

| Total Oxygen Enrichment (vol. %) | Avg. Energy Absorption in Gas Cooler and Radiant Section (% of furnace energy input) |
|---|---|
| 0 | 48.2 |
| 3.2 | 53.6 |
| Relative O$_2$ Enrichment Benefit | +11.1% |

Fly ash samples collected downstream of the air preheater were analyzed for carbon. Table 6 compares unburned carbon data collected for test runs with and without oxygen enrichment at specified ranges of stoichiometric ratio (ratio of oxidizer to fuel divided by theoretical minimum ratio needed for complete combustion). Oxygen enrichment yielded reductions in unburned carbon, relative to air-fuel combustion, for all cases presented. It should also be pointed out that carbon-in-ash levels for the petroleum coke used in these trials were relatively high, suggesting the potential for re-use of this ash as a fuel source.

TABLE 6

Comparison of Air-Fuel and O2-Enriched Carbon-in-Ash Levels

| Test Run | Stoichiometric Ratio (Range) | Avg. Carbon-in-Ash during Air-Fuel Tests (wt%) | Avg. Carbon-in-Ash during O2-Enrichment Tests (wt %) |
|---|---|---|---|
| 2C | 1.11–1.14 | 69.6 | 54.5 |
| 3C | 1.04–1.21 | 59.1 | 53.2 |
| 3D | 1.09–1.17 | 72.8 | 51.4 |

NOx Emissions

Figure 8:
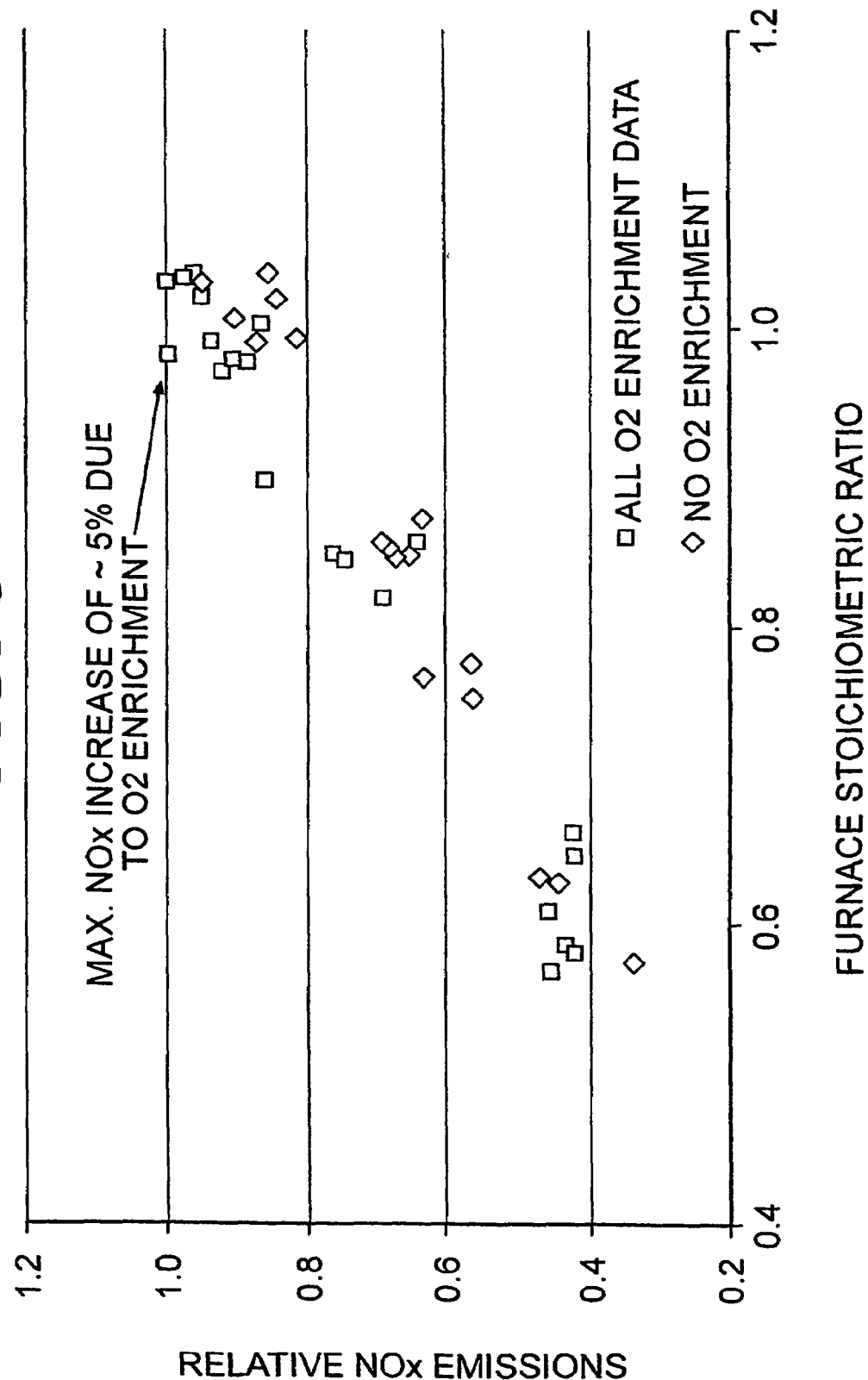
FIG. 8 is a plot of relative NOx emissions against furnace stoichiometric ratio for a petroleum coke demonstration test run under full load conditions.

NOx emissions generated from O2 enhanced combustion of petroleum coke were found to depend strongly upon both burner design and the mode of O2 injection. FIG. 8, for example, shows the variation of NOx emissions with and without oxygen enrichment versus furnace stoichiometric ratio obtained during test run 1B. Furnace stoichiometric ratio is defined herein as the stoichiometric ratio calculated without the contribution of over fire air. The difference in NOx characteristics between the air-fuel and oxygen-enriched cases was only of the order of 5%, the oxygen-enriched NOx levels being the higher of the two.

Figure 9:
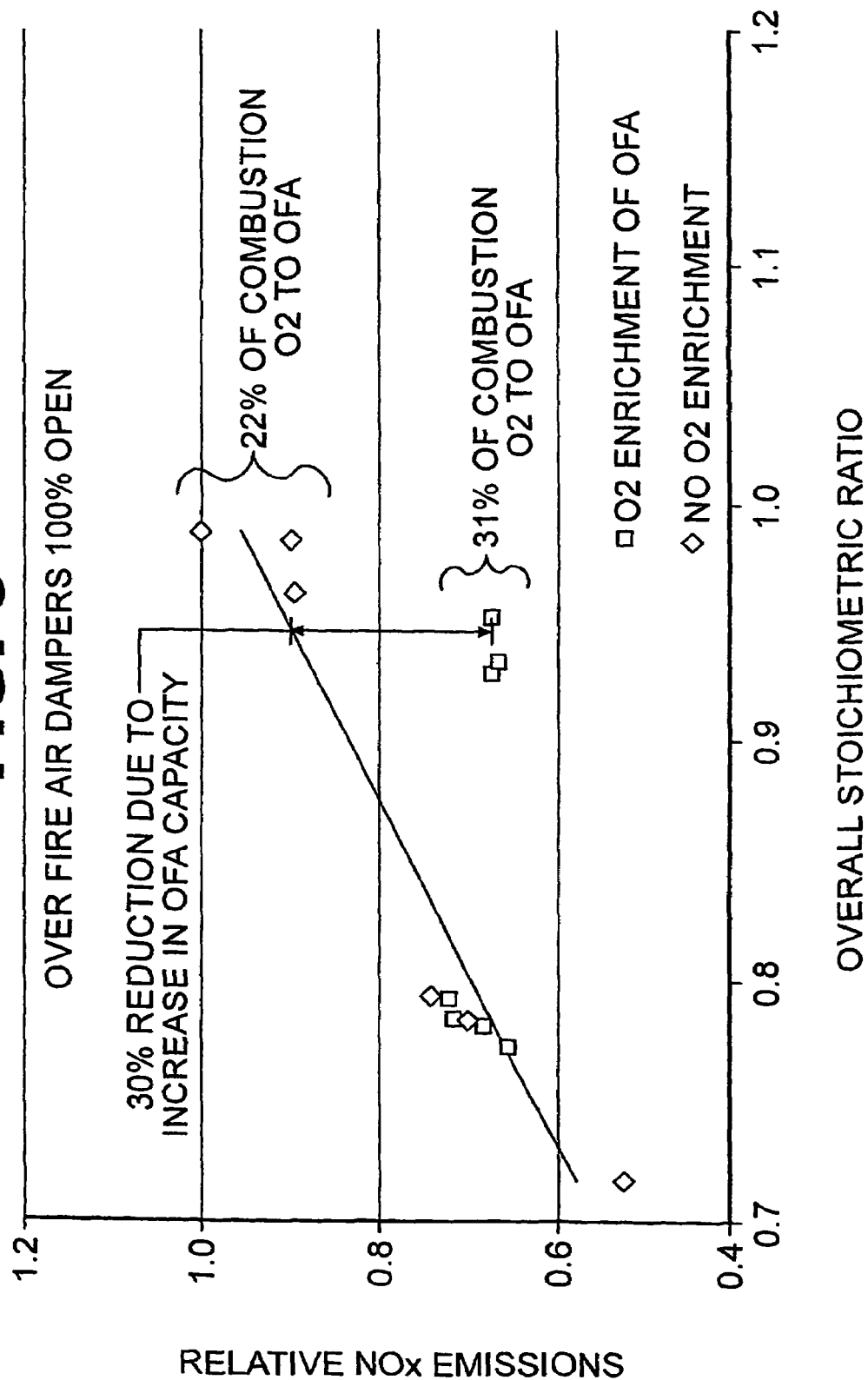
FIG. 9 is a plot of relative NOx emissions against the overall stoichiometric ratio with over fire air dampers at the full open position for a petroleum coke demonstration trial.

One mode of operation of this invention is to utilize the substantially pure oxygen to enrich the over-fire air stream, thereby increasing the degree of combustion "staging". In FIG. 9 a plot of relative NOx emissions against overall stoichiometric ratio (including the over fire air contribution for test run 1B) shows that, with over-fire air dampers wide open, oxygen enrichment of the over fire air can lower NOx by increasing the degree of combustion staging. In this case, by increasing the oxidizer content of the over-fire stream from 22 to 31% of the total combustion oxidizer, NOx was lowered approximately 30% relative to air-fuel operation at the same stoichiometric ratio.

Figure 10:
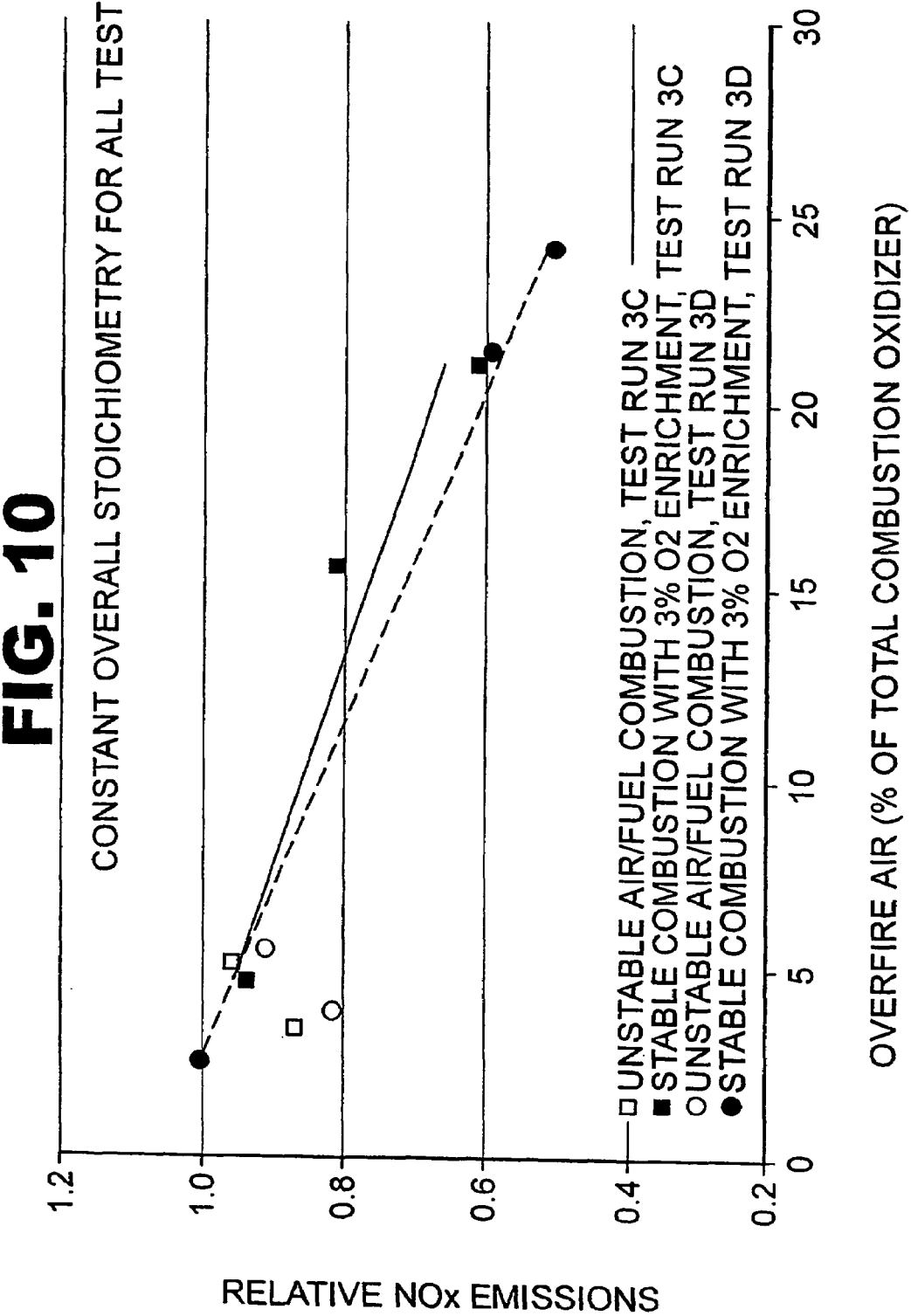
FIG. 10 is a plot of relative NOx emissions against percent of combustion oxidizer introduced through the overfire air registers for a petroleum coke demonstration trial.

Another mode of operation of this invention is to couple oxygen enrichment near the burner with optimized usage of the over-fire air dampers. In particular, test results showed that the flame stability achieved with near-burner enrichment permits the aggressive (i.e. maximized) usage of over-fire air without loss of thermal efficiency. By contrast, with air-fuel combustion, flames were unstable even without over-fire air and became more unstable and less efficient as over-fire air was admitted to the furnace. Hence, the strategy of near-burner oxygen enrichment with maximized over-fire air usage can substantially lower NOx emissions while still delivering performance benefits relative to air-fuel combustion. Test results illustrating the NOx benefits of this mode of operation are shown in FIG. 10, where NOx reductions in excess of 40% (relative to air-fuel) were achieved by coupling near burner oxygen enrichment with maximized over-fire air usage.

Figure 11:
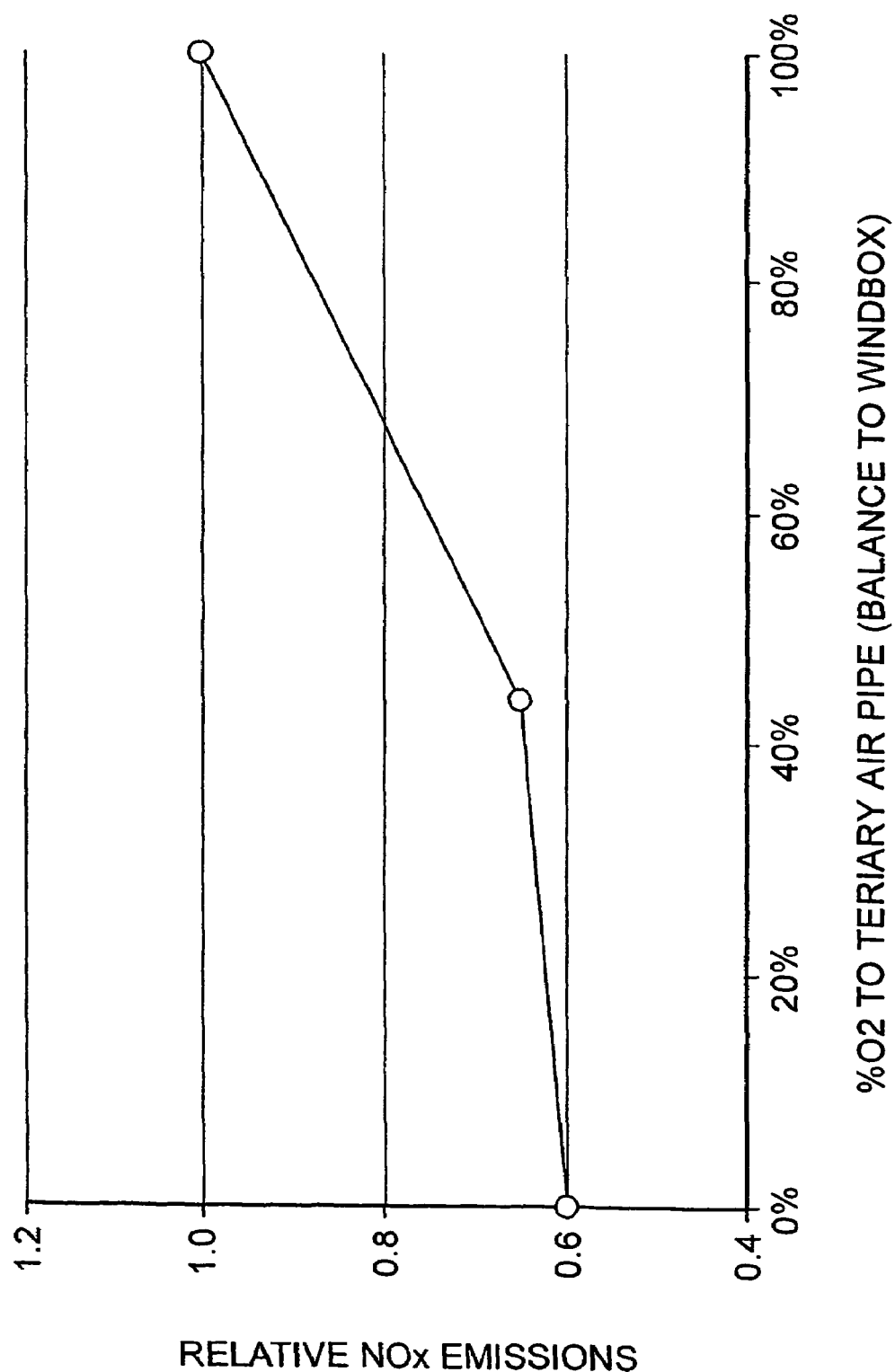
FIG. 11 is a plot of relative NOx emissions against the split of enriched oxygen between the wind box and tertiary air pipe for a petroleum coke demonstration trial.

FIG. 11 illustrates the dependence of NOx on the split of O2 enrichment between the wind box and tertiary air pipe (test run 3D). For this petroleum coke/burner combination, NOx increased sharply as the fraction of O2 injected into the tertiary air pipe increased beyond 40%.

When viewed in total, therefore, the demonstration results indicate that selective oxygen enrichment coupled with optimized usage of over-fire air, as disclosed in this invention, permit substantial reductions in boiler NOx emissions.

Radiant Section Heat Flux

As might be expected from the relatively high oxygen-enriched flame temperatures, furnace radiant section heat transfer was strongly influenced by oxygen enrichment. Direct measurement of radiant section heat flux was made using two calibrated water-cooled total heat flux probes positioned as shown in FIG. 2. Results indicate an average increase of 20% in radiant section heat flux at 3% oxygen enrichment. Radiant section heat absorption calculations based on an energy balance of cooling water within the slag panel 60 (FIG. 2) showed quantitatively similar trends. A composite plot of the heat flux data from test runs 2C, 3C and 3D is presented in FIG. 12. This aspect of the performance enhancement attributed to oxygen enrichment is particularly important as it can lead to higher steam production and, hence, the mitigation of unit de-rating that may otherwise occur in re-powering a fossil fuel boiler with petroleum coke.

Increase in Boiler Fuel Throughput

In addition to extending the operating range at the low end by enhancement of flame stability, oxygen enrichment can, in certain cases, extend the upper operating range by augmenting the availability of combustion oxygen beyond the capacity of the combustion air blowers. Test data showed that, at fixed overall stoichiometry and air blower flow rate, the peak fuel flow rate was increased approximately 16% (from 4800 to 5600 lb/hr) by 3% total oxygen enrichment of the combustion air without compromising combustion efficiency.

Thus summarized, demonstration results indicate the benefits of O2-enhanced petroleum coke combustion apply to a wide variety of petroleum coke properties and burner designs.

The present invention is, in one aspect, a process of combusting petroleum coke within a horizontally fired utility boiler. A minimal amount of support fuel can be used, but is not preferred, as the elimination of any support fuel during normal operations would be the lowest cost process. Furthermore, the most preferred mode uses selective O2 enrichment to enhance the process. Selective O2 enrichment allows for a) greater boiler turndown and increased operational flexibility due to enhanced flame stability b) higher thermal efficiency c) higher radiant transfer within the combustion zone and d) the potential for lower NOx emission than can be achieved with air-fuel combustion.

The use of selective O2 enrichment enables the stable operation of a burner at extremely low load levels. Although, as disclosed herein, a suspension swirl burner (Burner B) can itself operate at a reduced load with its normal configuration, selective O2 enrichment substantially improves the low load flame stability and allows further reductions in load. Importantly, when the swirl burner is adjusted to simulate a conventional suspension burner (Burner A), only a minimal turndown can be achieved without O2 enrichment. Other conventional suspension burners (Burners C and D) that were unable to combust petroleum coke in a stable manner using air-fuel technology operated extremely well over a wide range of conditions with O2 enrichment. Thus, selective O2 enrichments can offer improvements to current conventional burner performance. The range of fuel firing can be expanded through the use of O2 injection, which allows the improvement of a more flexible boiler.

This invention permits combustion up to 100% petroleum coke (without any support fuel) in a horizontally-fired industrial or utility boiler. The only alteration of the petroleum coke was size reduction prior to introduction of fuel through the burners. The composition of the petroleum coke is typical of a market grade petroleum coke and was achieved without any alteration of the coking process as suggested by the prior art. This invention allows for air-fuel combustion of unsupported petroleum coke, though this is not the preferred mode of operation. As the data clearly show, regardless of the burner design, selective O2 enrichment substantially enhances the petroleum coke combustion process by improving flame stability, increasing radiant heat transfer, reducing unburned carbon, increasing thermal efficiency and extending the range of operation relative to air-fuel firing.

The present invention has been demonstrated largely by direct injection of oxygen into the various streams. It is within the scope of the present invention to introduce oxygen proximate or adjacent to any of the oxidizer or fuel streams that are used in the combustion process. For example the burners 48, 50 of FIGS. 1 and 2 can have an oxygen lance or pipe disposed adjacent the outlet of the burner, over, aside or under the flame as it exits the burner or directly into the flame. The lance or pipe can be positioned to inject air parallel to the flame as it exits the burner or angularly into the flame. It a like manner oxygen can be introduced into any of the discrete air, air-fuel, or fuel streams entering the furnace.

In a like manner the introduction of secondary tertiary, or quaternary air can be introduced into the stream of primary air and petroleum coke directly or adjacent the stream using a straight or angled lance or pipe.

Having thus described our invention with regard to several embodiments, those skilled in the art will recognize modifications of the invention that are deemed to be within the scope of the invention with the full scope of the invention ascertained from the following claims.

What is claimed:

1. A method for combusting a fuel comprising at least eighty percent petroleum coke comprising the steps of:
    introducing a stream of primary air and the fuel comprising at least eighty percent petroleum coke into a combustion zone comprising a furnace which comprises a horizontally-fired burner having a position at an angle from coincident with a horizontal axis of the furnace un to an angle of 45 degrees to the horizontal axis of the furnace;
    simultaneously introducing one or more of secondary, tertiary, or quaternary air proximate said stream of primary air and the fuel as said stream of primary air and the fuel enters said combustion zone;
    optionally introducing over-fire air at a location above said combustion zone;
    introducing substantially pure oxygen into or proximate one or more of said stream-of primary air and the fuel as said stream of primary air and the fuel enters said combustion zone, said secondary air, said tertiary air, said quaternary air or said over-fire air, said substantially pure oxygen introduced in an amount to raise overall oxygen concentration to from 0.58% a by volume to a maximum of 10% a by volume greater than when combusting said fuel using only air as a source of oxidant; and recovering fly ash from said combustion zone for re-use as a fuel source.

2. A method for eliminating support fuel requirements when combusting a fuel consisting of petroleum coke using air fuel combustion in a combustion zone comprising a furnace which comprises a horizontally-fired burner having a position at an angle from coincident with a horizontal axis of the furnace up to an angle of 45 degrees to the horizontal axis of the furnace comprising the steps of:

discontinuing introduction of support fuel requirements into said combustion zone;

introducing a stream of primary air and the fuel consisting of petroleum coke into said combustion zone;

simultaneously introducing one or more of secondary, tertiary or quaternary air proximate said stream of primary air and the fuel consisting of petroleum coke as said stream of primary air and the fuel consisting of petroleum coke enters said combustion zone;

optionally introducing over-fire air at a location above said combustion zone; and introducing substantially pure oxygen into or proximate one or more of said stream of primary air and the fuel consisting of petroleum coke as said stream of primary air and the fuel enters said combustion zone, said secondary air, said tertiary air, said quaternary air or said over-fire air, said substantially pure oxygen introduced in an amount to raise overall oxygen concentration to from 0.58% a by volume to a maximum of 10% by volume greater than when combusting said fuel consisting of petroleum coke using only air as a source of oxidant.

3. The method according to claim 2 including the step of recovering fly ash from said combustion zone for re-use as a fuel source.

4. A method for combusting a fuel comprising at least eighty percent petroleum coke comprising the steps of:

introducing a stream of primary air and the fuel comprising at least eighty percent petroleum coke into said combustion zone comprising a furnace which comprises a horizontally-fired burner having a position at an angle from coincident with a horizontal axis of the furnace up to an angle of 45 degrees to the horizontal axis of the furnace;

simultaneously introducing one or more of secondary, tertiary, or quaternary air proximate said stream of primary air and the fuel as said stream of primary air and the fuel enters said combustion zone;

introducing over-fire air at a location above said combustion zone;

introducing substantially pure oxygen into or proximate one of more of said stream-of primary air and the fuel as said stream of primary air and the fuel enters said combustion zone, said secondary air, said tertiary air, said quaternary air or said over-fire air, said substantially pure oxygen introduced in an amount to raise overall oxygen concentration to form 0.58% by volume to a maximum of 10% by volume greater than when combusting said fuel using only air as a source of oxidant; and maximizing the volume of said over-fire air introduced into said combustion zone.

5. The method according to claim 4, including the step of recovering fly ash from said combustion zone for re-use as a fuel source.

6. The method according to claim 4, including the step of increasing the concentration of said petroleum coke in said primary air prior to introducing said primary air and said petroleum coke into said combustion zone.

* * * * *

UNITED STATES PATENT AND TRADEMARK OFFICE
CERTIFICATE OF CORRECTION

PATENT NO. : 7,185,595 B2 Page 1 of 1
APPLICATION NO. : 10/488583
DATED : March 6, 2007
INVENTOR(S) : Mark D. D'Agostini et al.

It is certified that error appears in the above-identified patent and that said Letters Patent is hereby corrected as shown below:

Column 14, line 56, "un": should read --up--

Column 15, line 3, "0.58% a" should read --0.58%--

Column 15, line 4, "10% a" should read --10%--

Signed and Sealed this

Twenty-sixth Day of February, 2008

JON W. DUDAS
*Director of the United States Patent and Trademark Office*